Aug. 28, 1962 ERNST-GÜNTHER TROST 3,051,780

VIDEO-FREQUENCY CONTRAST-CONTROL ARRANGEMENT FOR TELEVISION RECEIVERS

Filed April 4, 1960

INVENTOR
E.G. TROST
BY C.H. Suydam
AGENT 3,051,780
VIDEO-FREQUENCY CONTRAST-CONTROL ARRANGEMENT FOR TELEVISION RECEIVERS Ernst-Günther Trost, Durlach, Germany, assignor to International Standard Electric Corporation, New York, N.Y., a corporation of Delaware Filed Apr. 4, 1960, Ser. No. 19,645
1 Claim. (Cl. 178—7.5)

This invention relates to a video-frequency contrast-control arrangement for television receivers, with a galvanic (metallic) coupling between the demodulator and the control element of the picture tube with a keyed gain control.

In conventional types of contrast-control circuits for television receivers with RC-couplings between the R.F.-demodulator and the control element of the picture tube it is impossible to control or to adjust the contrast in such a way that the black-value is not changed at the same time, except when employing a special black-value control circuit. The circuit arrangements which are provided especially for this purpose, either with respect to the control elements which are mechanically coupled (cf. for example, French Pat. No. 811,443) or to the control elements which are electrically coupled (for example, German Pat. No. 967,771) are a considerable cost factor, disregarding the fact that the RC-circuit is imperfect from the electrical point of view. If, on the other hand, these additional and expensive arrangements are not used then, two manual controls (brightness and contrast control) have to be actuated alternately several times during the adjustment of the contrast.

This disadvantage is eliminated by the invention which permits to adjust the contrast to be adjusted while the black-value, as transmitted by the television transmitter, is kept substantially constant, that is, independent of the picture signal.

The invention is characterized by the fact that the resistors, comprising the internal resistance of the video-amplifier tube, the operating resistance thereof, and the resistance of the contrast-control, are so arranged as to form a bridge or compensating network, such that, without the employment of non-linear resistors and during the variation of the amplification, a predetermined direct-voltage value, preferably the black-value of the picture-, blanking- and synchronizing-signal, is not varied as well.

According to the invention the resistor of the contrast-control is arranged in the diagonal branch of the bridge network and is adjusted to the desired direct-voltage value, in particular with respect to the black-value of the picture-, blanking- and synchronizing-signal amplitude, to the cross-current value zero.

This invention may be readily understood from the following description of a specific embodiment thereof when read with reference to the accompanying drawings, in which.

Figures 1, 2:
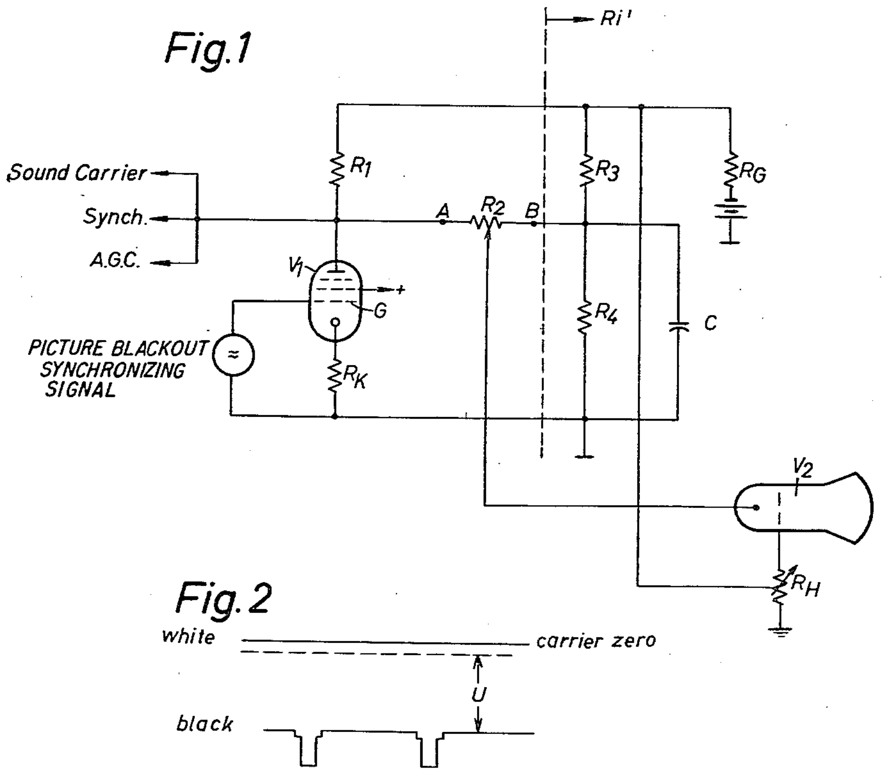
FIG. 1 shows an example of an embodiment of the invention.
FIG. 2 is a signal representation for explaining the mode of operation of the invention.

Referring to the control grid of the video-tube $V_1$, a picture-, blanking- and sychronizing-signal (PBS-signal) is applied, as denoted in FIG. 2. Merely for reasons of clarity it is assumed that the PBS signal voltage, represented by $u$, is permanently constant. If this PBS-signal is applied to the grid G of the tube $V_1$ (FIG. 1), then a certain current will flow through this tube. Accordingly, a corresponding voltage drop will appear across the operating resistor $R_1$. This voltage drop is also applied to the point A of the contrast-control $R_2$. When taking care that the same voltage also prevails at the connecting point B of the contrast-control, no current will flow through the contrast-control. This has the advantage that, on the one hand, the loading ability of the contrast-control can be chosen relatively small and, on the other hand, the voltage at the tapping point C, upon readjusting the control $R_2$ will not change so that, consequently, also the brightness value on the picture tube $V_2$ will not change. $R_H$ is the actual brightness control on the picture tube $V_2$, and $R_k$ represents the cathode resistance of the video-amplifier tube $V_1$.

The invariability of the black-value during the video-frequency contrast-control by providing same or like potentials for the points A and B in relation to the black-value of the signal is achieved, in accordance with the given specific embodiment, in that the resistors $R_1$ (operating resistor of the video-amplifier tube $V_1$), $R_2$ (resistor of the contrast control) and $Ri(V_1)$ (internal resistance of the video-amplifier tube $V_1$) are connected together with the aid of the corresponding resistors $R_3$ and $R_4$ to form a bridge network, so that without the employment of non-linear resistors for the picture information "black" no variation of the black-value on the picture tube is effected during the readjustment of the contrast-control. $R_3$ is connected with its one end to the end of the resistor $R_1$ not facing the tube, or to the positive pole of the power-supply source, and is connected with its other end to point B of the resistor $R_2$. The resistor $R_4$ has one end connected to point B, and its other end connected to ground. The capacitor C is additionally connected in parallel with $R_4$, in order to bypass the alternating voltage across the resistor $R_4$.

Figure 3:
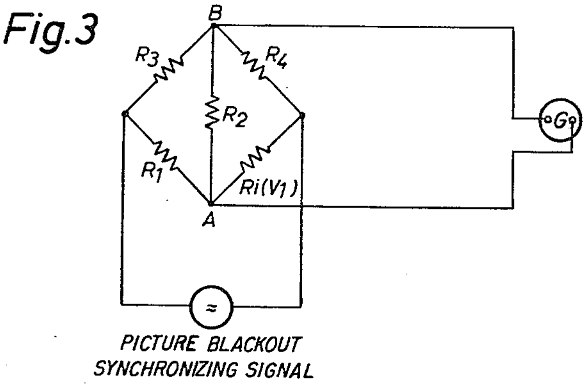
FIG. 3 is a detailed representation of the bridge circuit employed according to the invention and shown in FIG. 1.

FIG. 3 is a detailed representation of the actual bridge circuit. The references are the same as in FIG. 1, so that they do not need to be explained again. Arrangement D, symbolically shown as a bridge galvanometer, represents the connection of the cathode of the picture tube to ground. It will be easily seen that the resistor $R_2$ is arranged in the diagonal branch of the bridge which, in the given specific embodiment with respect to the voltage "black," is adjusted to the cross-current value zero.

If the amplification of the D.-C. component is also to be controlled to the same extent as the amplification of the alternating voltage, then it must also be borne in mind that the value of resistance between point B and ground must be very low. In this case the part of the circuit arrangement on the right-hand side of B, which may be regarded as the direct-voltage generator B′, must theoretically have an internal resistance, R$i$, of zero ohm. In practice, however, it is sufficient that $Ri' < R_2$, in which R$i'$ is accordingly represented by the expression $$Ri' = \frac{(R_3 + R_G)R_4}{R_3 + R_G + R_4} (\rightarrow 0)$$

in which $R_G$ represents the internal resistance of the source of direct voltage.

It will be easily seen that a very constant amplitude of the synchronizing signals is obtainable at point A for the automatic gain control, as well as for the line and picture synchronization. Furthermore, a sound carrier which, with respect to its amplitude, is independent of the contrast-control, is available at this point for the sound-IF-amplification purpose.

While I have described above the principles of my invention in connection with specific apparatus, it is to be clearly understood that this description is made only by way of example and not as a limitation ot the scope of my invention as set forth in the objects thereof and in the accompanying claim.

What is claimed is:

A contrast control circuit arrangement for a television receiver comprising:

a video amplifier having an input terminal for a video signal and an output terminal;

a picture reproducing device having a control electrode and a biasing electrode;

a brightness control connected between said biasing electrode and said control electrode for adjusting the black level of the reproduced picture;

a direct current network connected between said output terminal and said control electrode comprising three resistors and the internal resistance of said video amplifier connected as a resistive bridge having four arms and two opposite diagonals;

a voltage source connected across one of said diagonals;

a contrast control resistor connected across the other diagonal;

means for adjusting the resistance value of at least one of the arms of said resistive bridge for reducing the potential difference across said contrast control to substantially zero during the blanking period of the video signal, said potential difference varying directly with the signal voltage during the picture period;

and adjustable means connected between said contrast control resistor and said control electrode for varying the picture contrast independently of the brightness of said reproduced picture.

References Cited in the file of this patent

UNITED STATES PATENTS

| | | |
|---|---|---|
| 2,757,235 | Macovski | July 31, 1956 |
| 2,828,357 | Fyler | Mar. 25, 1958 |

FOREIGN PATENTS

| | | |
|---|---|---|
| 1,228,697 | France | Aug. 31, 1960 |